(12) United States Patent
Muneoka et al.

(10) Patent No.: US 9,090,469 B2
(45) Date of Patent: Jul. 28, 2015

(54) METHOD OF PRODUCING A SPHERICAL ALUMINUM NITRIDE POWDER

(75) Inventors: Takatoshi Muneoka, Shunan (JP); Kazutaka Watanabe, Shunan (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 110 days.

(21) Appl. No.: 13/823,017

(22) PCT Filed: Sep. 27, 2011

(86) PCT No.: PCT/JP2011/072098
§ 371 (c)(1),
(2), (4) Date: Mar. 13, 2013

(87) PCT Pub. No.: WO2012/043574
PCT Pub. Date: Apr. 5, 2012

(65) Prior Publication Data
US 2013/0171451 A1    Jul. 4, 2013

(30) Foreign Application Priority Data

Sep. 28, 2010 (JP) ................................ 2010-217804

(51) Int. Cl.
*C01B 21/072* (2006.01)
*C01F 17/00* (2006.01)

(52) U.S. Cl.
CPC ........... *C01B 21/072* (2013.01); *C01B 21/0726* (2013.01); *C01F 17/0025* (2013.01); *C01P 2002/54* (2013.01); *C01P 2002/77* (2013.01); *C01P 2004/03* (2013.01); *C01P 2004/32* (2013.01); *C01P 2004/54* (2013.01); *C01P 2004/61* (2013.01); *C01P 2006/32* (2013.01); *C01P 2006/80* (2013.01); *Y10T 428/2982* (2015.01)

(58) Field of Classification Search
USPC ........... 428/402; 419/23, 34, 45, 57; 264/125, 264/332; 423/409; 501/98.4
See application file for complete search history.

(56) References Cited

U.S. PATENT DOCUMENTS

| | | | | |
|---|---|---|---|---|
| 4,615,863 | A | * | 10/1986 | Inoue et al. ..................... 419/23 |
| 5,114,695 | A | * | 5/1992 | Jain et al. ....................... 423/411 |
| 2002/0047110 | A1 | | 4/2002 | Takao et al. |
| 2005/0173094 | A1 | | 8/2005 | Mori |
| 2010/0255304 | A1 | | 10/2010 | Amano et al. |
| 2013/0164534 | A1 | | 6/2013 | Muneoka et al. |
| 2013/0171451 | A1 | | 7/2013 | Muneoka et al. |
| 2013/0244036 | A1 | | 9/2013 | Muneoka et al. |

FOREIGN PATENT DOCUMENTS

| | | |
|---|---|---|
| CN | 101830448 A | 9/2010 |
| EP | 0271353 A2 | 6/1988 |
| JP | 62-207703 A | 9/1987 |
| JP | 64-56308 A | 3/1989 |
| JP | 1-119573 A | 5/1989 |
| JP | 3-23206 A | 1/1991 |
| JP | 4-74705 A | 3/1992 |
| JP | 5-139709 A | 6/1993 |
| JP | 5-221618 A | 8/1993 |
| JP | 9-52704 A | 2/1997 |
| JP | 11-269302 A | 10/1999 |
| JP | 2002-97006 A | 4/2002 |
| JP | 2002-179413 A | 6/2002 |
| JP | 2005-132699 A | 5/2005 |
| JP | 2005-162555 A | 6/2005 |
| TW | 177325 | 1/1992 |
| WO | WO 03/097527 A1 | 11/2003 |
| WO | WO 2009/066663 A1 | 5/2009 |

OTHER PUBLICATIONS

International Search Report for PCT/JP2011/072098 dated Jan. 10, 2012.
Taiwanese Office Action, dated Dec. 30, 2014, for Taiwanese Application No. 100135050.
Chinese Office Action dated May 21, 2014, issued in Chinese Patent Application No. 201180041078.2.
Chinese Office Action dated Sep. 5, 2014 in Chinese Patent Application No. 201180041466.0.
Chinese Office Action issued on Jan. 6, 2014 in Chinese Patent Application No. 201180005141.7.
Extended European Search Report dated May 8, 2014, issued in European Patent Application No. 11737197.1.
International Search Report issued in PCT/JP2011/051886, mailed on Apr. 19, 2011.
International Search Report issued in PCT/JP2011/069815, mailed on Nov. 22, 2011.
Japanese Office Action dated Sep. 2, 2014, issued in Japanese Patent Application No. 2011-551953.
T. Suehiro et al.; Morphology-retaining synthesis of AlN particles by gas reduction-nitridation; Materials Letters; No. 57; 2002; pp. 910-913.
U.S. Office Action for U.S. Appl. No. 13/516,268, dated May 7, 2014.
U.S. Office Action for U.S. Appl. No. 13/820,384, dated Oct. 6, 2014.

\* cited by examiner

*Primary Examiner* — Leszek Kiliman
(74) *Attorney, Agent, or Firm* — Birch, Stewart, Kolasch & Birch, LLP

(57) ABSTRACT

To provide a method of producing a spherical aluminum nitride powder which has a large thermal conductivity and excellent filling property, and is useful as a filler for heat-radiating materials.
[Means for Solution] The spherical aluminum nitride powder is produced by reductively nitriding a mixture of 100 parts by mass of an alumina or an alumina hydrate, 0.5 to 30 parts by mass of a rare earth metal compound and 38 to 46 parts by mass of a carbon powder at a temperature of 1620 to 1900° C. for not less than 2 hours.

2 Claims, 1 Drawing Sheet

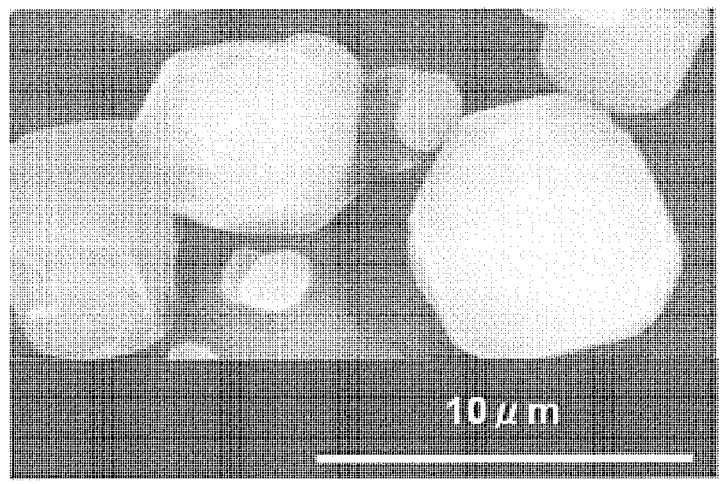

METHOD OF PRODUCING A SPHERICAL ALUMINUM NITRIDE POWDER

TECHNICAL FIELD

This invention relates to a method of producing a spherical aluminum nitride powder that can be favorably used as a filler for heat radiating materials for improving heat radiating property by being filled in a resin, a grease, an adhesive or a coating material.

BACKGROUND ART

The aluminum nitride has an excellent electrically insulating property and a high thermal conductivity, and it has been expected that the materials such as resin, grease, adhesive and coating material filled with a sintered product thereof or a powder thereof can be used as heat radiating materials featuring a high thermal conductivity.

In order to improve the thermal conductivity of the heat radiating materials, it is important to densely fill the matrix such as resin with a filler having a high thermal conductivity. For this purpose, it has been strongly urged to provide an aluminum nitride powder of a spherical shape having a particle diameter of from about several microns to about several tens of microns.

The aluminum nitride powder has, usually, been produced by an alumina reductive nitridation method which reductively nitrides a composition of alumina and carbon, a direct nitridation method which reacts aluminum directly with nitrogen, and a gas-phase method which reacts alkylaluminum with ammonia and, thereafter, heats them. Of them, the aluminum nitride powders obtained by the reductive nitridation method and by the gas-phase method have shapes close to a sphere but their particle diameters are still of the order of sub-microns.

According to the direct nitridation method, on the other hand, the aluminum nitride powder is obtained through the pulverization and classification, making it relatively easy to control the particle diameter and to obtain the aluminum nitride powder having particle diameters of from about several microns to about several tens of microns. However, the particles constituting the powder are angular non-spherical particles. Therefore, the aluminum nitride powder obtained by the above method cannot be highly densely filled in the resin.

Therefore, a variety of methods have been studied in order to obtain the aluminum nitride powder of a spherical shape having a desired particle diameter.

For example, a patent document 1 discloses a method of obtaining an aluminum nitride powder of a round shape having an average particle diameter of not less than 3 μm by firing a mixture of an alumina powder and a carbon powder in an inert atmosphere to form an aluminum carbide permitting particles thereof to grow and then firing the particles thereof in a non-oxidizing atmosphere containing nitrogen. This method, however, involves the conversion of the firing atmosphere making it difficult to control the growth of alumina particles, i.e., making it difficult to control the particle size distribution of the obtained aluminum nitride powder.

Further, a patent document 2 discloses a method of producing a spherical aluminum nitride powder having an average particle diameter of not more than 50 μm, a sphericalness of not less than 0.8 and excellent water-resisting property by reductively nitriding a spherical alumina with a nitrogen gas or an ammonia gas in the presence of carbon and, thereafter, oxidizing the surfaces thereof. According to this production method, however, the spherical shape of the starting alumina becomes directly the shape of the aluminum nitride powder which is the final product, and it is necessary to use the alumina having a large particle diameter equal to the desired particle diameter. With the alumina having such a large particle diameter being reductively nitrided, however, the reaction must be conducted for an extended period of time to improve the conversion. As a result, the oxygen concentration increases in the obtained aluminum nitride, and thermal conductivity decreases accordingly.

On the other hand, a patent document 3 discloses a method of producing an aluminum nitride powder by using, as a starting material, a mixed powder of an aluminum oxide powder, a carbon powder and an alkaline earth metal compound or a rare earth element compound, and firing the mixed powder in a non-oxidizing atmosphere containing nitrogen. This method is to form the aluminum nitride at a low temperature of not higher than 1,500° C. by utilizing the action of the alkaline earth metal compound or the rare earth compound for accelerating the reaction. However, the aluminum nitride powder obtained by this method has a particle diameter of, concretely speaking, about 1 μm, and relatively large particle diameters of the order of several microns have not been realized yet.

Further, a patent document 4 discloses a method of obtaining a crystalline aluminum nitride powder by ripening (heat-treating) an amorphous aluminum nitride powder in a flux comprising compounds of alkaline earth elements or rare earth elements so as to assume a spherical shape and, thereafter, dissolving the flux to isolate the crystalline aluminum nitride powder. This production method is capable of achieving a high fluidity and a high filling ratio permitting, however, impurities to easily infiltrate into the aluminum nitride powder requiring, therefore, strict control of production conditions, i.e., increasing number of the steps and driving up the cost of production.

PRIOR ART DOCUMENTS

Patent Documents

Patent document 1: JP-A-3-23206
Patent document 2: JP-A-2005-162555
Patent document 3: JP-A-5-221618
Patent document 4: JP-A-2002-179413

OUTLINE OF THE INVENTION

Problems that the Invention is to Solve

It is, therefore, an object of the present invention to provide a method of producing a spherical aluminum nitride powder having a spherical shape best suited for use as a filler and an average particle diameter of 3 μm to 30 μm maintaining good productivity.

Means for Solving the Problems

In order to solve the above problems, the present inventors have conducted keen research, have found that an aluminum nitride powder of a spherical shape having a desired particle diameter can be obtained with good productivity by using a mixed powder of an alumina or an alumina hydrate, a carbon powder and a compound containing a rare earth element at a specific ratio, and reductively nitriding the mixed powder at a specific temperature, and have completed the present invention.

That is, according to the present invention, there is provided a method of producing a spherical aluminum nitride powder, comprising:

mixing 100 parts by mass of an alumina or an alumina hydrate, 0.5 to 30 parts by mass of a compound containing a rare earth metal, and 38 to 46 parts by mass of a carbon powder to obtain a mixture thereof; and reductively nitriding the alumina or the alumina hydrate by holding the mixture in a nitrogen-containing atmosphere at a temperature of 1620 to 1900° C. for not less than 2 hours.

According to the present invention, further, there is provided a spherical aluminum nitride powder comprising aluminum nitride particles having an average particle diameter of 3 to 30 μm, a content of the rare earth metal in a range of 0.4% by weight to 28% by weight calculated as an oxide thereof, and a lattice constant of the C-axis of the aluminum nitride crystals of not less than 4.9800 Å. The spherical aluminum nitride powder can be produced by the above-mentioned method.

Effects of the Invention

The spherical aluminum nitride powder obtained by the production method of the invention comprises particles of a round shape without corner, the particles having a high sphericalness of a ratio of long diameter and short diameter (DS/DL) of not less than 0.75. Further, the average particle diameter is 3 to 30 μm, and the content of oxygen is small since the rare earth metal has been contained in a predetermined amount. Accordingly, the lattice constant of the C-axis of the aluminum nitride crystals is not less than 4.9800 Å.

Here, the average particle diameter stands for a particle diameter of when a cumulative volume in the particle size distribution is 50% as measured by the laser diffraction light scattering method.

Further, the lattice constant of the C-axis of the aluminum nitride crystals is a value measured by using an X-ray diffraction apparatus and by using Si as the external standard material.

That is, the aluminum nitride powder obtained by the present invention exhibits the lattice constant of the C-axis of the aluminum nitride crystals of as large as not less than 4.9800 Å yet having an average particle diameter of 3 to 30 μm which is an ever large particle diameter. The lattice constant of the C-axis serves as an index for evaluating the concentration of oxygen solidly dissolved in the aluminum nitride particles. The larger the value, the smaller the concentration of oxygen solidly dissolved in the aluminum nitride particles and, therefore, the higher the thermal conductivity thereof.

According to the present invention as described above, it is allowed to obtain the aluminum nitride powder having a particle diameter and a shape best suited for use as a filler maintaining good productivity. For instance, the spherical aluminum nitride powder has a spherical shape of a high sphericalness and a desired particle diameter, and not only can be densely filled in a resin or a grease but also has a high thermal conductivity and is capable of imparting a high thermal conductivity to the heat-radiating materials.

Concerning the action and mechanism of the method of the invention for producing the spherical aluminum nitride powder having the above-mentioned properties, the present inventors presume as described below.

Namely, according to the method of the present invention which uses the alumina as well as the compound containing rare earth metal, a liquid phase in which the alumina is dissolved is formed, first, under a specific temperature condition for reductive nitridation. Here, since the amount of the carbon powder that is added has been controlled to lie in a predetermined range relative to the alumina, the alumina dissolves in an adjusted amount in the liquid phase that is formed, whereby aggregates having a desired particle diameter are formed and, at the same time, the reductive nitridation takes place. Since the reductive nitridation is conducted under the specific temperature condition, oxygen solidly dissolves in decreased amounts in the aluminum nitride crystals due to the compound containing rare earth metal remaining in the particles. As a result, it is presumed that the spherical aluminum nitride powder having the above-mentioned properties is obtained.

BRIEF DESCRIPTION OF THE DRAWING

FIG. 1 is an electron microphotograph showing the structure of particles in a spherical aluminum nitride powder obtained in Example 1.

MODE FOR CARRYING OUT THE INVENTION

The production method of the present invention uses an Al source, a carbon powder and a compound containing rare earth metal, mixes them together at a specific mass ratio, reductively nitrides the mixture under specific conditions and, further, executes the decarbonization treatment as required to produce the desired spherical aluminum nitride powder maintaining good reproduceability.

<Al Source>

An alumina or an alumina hydrate is used as the Al source.

The Al source may be an alumina having a crystal structure such as of α, γ, θ, δ, η, κ or χ, or may be an alumina hydrate such as boehmite, diaspore, gibbsite, bayerite or toddite which, upon heating, is dehydrated and is finally transited wholly or partly into an α-alumina. These compounds may be used in a single kind or may be of different kinds that are mixed together. In the invention, preferred examples of the Al source are α-alumina, γ-alumina and boehmite which have particularly high reactivities and are easy to control.

Further, it is desired that the alumina or the alumina hydrate used as the Al source has an average particle diameter of not more than 2 μm. Namely, when the particles having a large average particle diameter are used, the rate of the reductive nitridation may decrease.

<Carbon Powder>

The carbon powder used in the present invention works as a reducing agent, and may be a carbon black or a graphite powder. As the carbon black, there can be preferably used furnace black, channel black or acetylene black.

The carbon powder that is used has a BET specific surface area of, desirably, 0.01 to 500 m$^2$/g.

<Compound of Rare Earth Metal>

As the rare earth metal contained in the compound used in the invention, there can be exemplified yttrium, lanthanum, praseodymium and terbium. The compound may be representatively an oxide, a carbide or a halide.

Among such rare earth metal compounds according to the present invention, there can be preferably used those that are capable of melting together with the alumina at 1200 to 1900° C. and, specifically, at 1300 to 1800° C. If, for example, there is used a compound that is capable of melting with the alumina at a temperature of lower than 1200° C., the alumina particles tend to be aggregated together. If a compound having the above temperature in excess of 1900° C. is used, on the other hand, the particles little assume the spherical shape.

As preferred rare earth metal compounds, there can be exemplified such oxides as yttrium oxide, lanthanum oxide, praseodymium oxide and terbium oxide, and such halides as fluoride, which may be used in one kind alone or in a plurality of kinds in combination. Among these rare earth metal compounds, yttrium and lanthanum compounds are preferred, and yttrium oxide is most preferred.

Further, the compound that contains the rare earth metal element may be the one that is capable of forming an oxide, a carbide or a halide of the rare earth metal exemplified above during the reductive nitridation. For example, there can be also favorably used a carbonate, a nitrate, an acetate or a hydroxide of a rate earth metal.

The rare earth metal compound used in the present invention is of the shape of particles and though there is no specific limitation, the particle diameter is, usually, in a range of 0.01 to 100 μm and, specifically, 0.1 to 30 μm. Further, the specific surface area (BET) thereof, though there is no specific limitation, is, usually, in a range of 0.01 to 500.0 $m^2/g$ and, specifically, 0.1 to 100.0 $m^2/g$.

<Other Materials>

In the present invention, it is allowable to also use in combination a sintering assistant such as an oxide, a carbide or a halide of an alkaline earth metal (typically, a calcium oxide) capable of melting together with the alumina at 1200 to 1900° C. and, preferably, at 1300 to 1800° C. in a range in which it assumes the desired shape and particle diameter but does not impair the effects of the present invention.

<Mixing the Starting Materials>

The above starting materials are mixed together and are fed to the step of reductive nitridation. There is no specific limitation on the mixing means if the materials can be homogeneously mixed together. Usually, however, the starting materials are mixed by using a blender, a mixer or a ball mill.

There are mixed the rare earth metal compound in an amount of 0.5 to 30 parts by mass, preferably, 1 to 25 parts by mass and, more preferably, 2 to 10 parts by mass calculated as an oxide thereof, and the carbon powder in an amount of 38 to 46 parts by mass, preferably, 39 to 45 parts by mass and, more preferably, 40 to 44 parts by mass per 100 parts by mass of the Al source such as the alumina.

If, for example, the rare earth metal compound is used in too small amounts, the aluminum nitride particles grow to a degree which is not sufficient, the particle diameter does not become 3 microns or more, and the lattice constant of the C-axis of the aluminum nitride crystals becomes small. This is presumably due to that the liquid phase is not formed in a sufficiently large amount through the reductive nitridation. If used in too large amounts, on the other hand, the rare earth metal compound remains in the aluminum nitride powder as impurity, whereby the aluminum nitride particles aggregate together and the obtained aluminum nitride powder contains much coarse particles that are unnecessarily rough.

Further, if the carbon powder is used in too large amounts, the Al source such as the alumina is made present in a sparse state in the mixture letting the aluminum nitride particles to grow insufficiently through the firing, and making it difficult to obtain the spherical aluminum nitride powder having an average particle diameter of not less than 3 microns. If the carbon powder is used in too small amounts, further, the Al source such as the alumina aggregates together vigorously, and the obtained aluminum nitride powder contains much coarse particles that are unnecessarily rough like when the rare earth metal compound is used in too large amounts.

<Reductive Nitridation>

In the present invention, the reductive nitridation is carried out by holding the mixture of the starting materials including at least the above-mentioned Al source, carbon powder and rare earth metal compound in a nitrogen atmosphere (e.g., in a nitrogen gas stream) at a temperature of 1620 to 1900° C., preferably, 1650° C. to 1800° C. and, most preferably, 1680 to 1750° C. for 2 to 50 hours and, preferably, 5 to 20 hours and, most preferably, 8 to 17 hours.

That is, the reductive nitridation of the Al source is carried out by firing fine particles of the Al source (alumina or alumina hydrate) together with the rare earth metal compound (eutectic agent) under a condition where the carbon powder which is a reducing agent is present in the above-mentioned temperature range.

In the present invention, the rare earth metal compound that is added does not almost scatter even during the reductive nitridation and, therefore, oxygen that is solidly dissolved in the AlN particles can be efficiently decreased. The obtained aluminum nitride powder contains the rare earth metal in an amount of 0.4 to 28% by weight.

If the firing temperature is lower than 1620° C., the lattice constant of the C-axis of the AlN crystals is small, and the AlN particles possess a decreased thermal conductivity. If the firing temperature exceeds 1900° C., on the other hand, the rate earth metal compound scatters in short periods of time, an oxynitride (AlON) of a low thermal conductivity is often formed, and oxygen easily and solidly dissolves in the AlN particles causing a decrease in the thermal conductivity thereof and permitting the AlN particles to easily aggregate together.

The amount of oxygen solidly dissolved in the AlN particles can be presumed from the lattice constant of the C-axis of the AlN crystals.

Further, if the firing time is shorter than 2 hours, the nitridation reaction is not completed, the AlN particles fail to assume the spherical shape and, besides, the lattice constant of the C-axis of the AlN crystals decreases. On the other hand, if the firing time exceeds 50 hours, the AlN particles aggregate together, and coarse particles tend to be formed.

The above firing (reductive nitridation) can be conducted by any method provided nitrogen is allowed to diffuse in the starting mixed powder to a sufficient degree. For instance, there can be employed a method which executes the firing by filling a carbon setter or the like with the starting mixed powder and flowing nitrogen therethrough, a method which executes the firing by feeding the starting mixed powder to a rotary kiln, or a method which executes the firing of the starting mixed powder by using a fluidized layer. Among them, particularly preferred is the method that executes the firing by filling the carbon setter with the starting mixed powder and flowing nitrogen therethrough.

<Decarbonization Treatment>

In the present invention, the aluminum nitride powder obtained through the above reaction contains excess of carbon powder. It is, therefore, desired to conduct the decarbonization treatment.

The decarbonization treatment is to remove carbon by oxidation, and is carried out by using an oxidizing gas. As the oxidizing gas, any gas such as the air or oxygen can be used without limitation provided it is capable of removing carbon. From the standpoint of economy and the oxygen concentration in the obtained aluminum nitride, however, the air is preferred. Further, the treating temperature is, usually, 500 to 900° C. and, preferably, 600 to 750° C. by taking into consideration the efficiency of decarbonization and excess of oxidation on the surfaces of the aluminum nitride.

If the oxidizing temperature is too high, the surfaces of the aluminum nitride powder are oxidized to an excess degree often making it difficult to obtain the spherical aluminum nitride powder having a desired oxygen concentration. It is, therefore, desired to select a suitable oxidizing temperature and time.

<Spherical Aluminum Nitride Powder>

The thus obtained spherical aluminum nitride powder of the invention has an average particle diameter of 3 to 30 µm, preferably, 3 to 20 µm and, more preferably, 3 to 10 µm.

Due to the use of the above-mentioned rare earth metal compound, the spherical aluminum nitride powder contains the rare earth metal compound (most desirably, yttrium oxide) in an amount of 0.4 to 28% by weight, preferably, 0.9 to 23% by weight and, most preferably, 1.8 to 9.0% by weight calculated as an oxide thereof. Being related to the amount of the rare earth metal, the lattice constant of the C-axis of the crystals becomes not less than 4.9800 Å, specifically, not less than 4.9802 Å and, further, not less than 4.9804 Å, from which it is learned that oxygen is solidly dissolved little in the aluminum nitride particles. That is, the above value is achieved by a special production method by using a compound that contains the above-mentioned specific rare earth metal element. The spherical aluminum nitride of the present invention, therefore, exhibits a large thermal conductivity and, when filled in a resin, exhibits the effect of improving the thermal conductivity to a high degree.

Further, the ratio (DS/DL) of the long diameter and the short diameter of the AlN particles constituting the powder is not less than 0.75, preferably, not less than 0.80 and, more preferably, not less than 0.85. The aluminum nitride particles having the ratio of the long diameter and the short diameter of not less than 0.75 can be highly densely filled in a resin that serves as the matrix. In addition to having the above ratio DS/DL, the AlN particles have a shape free of corners as shown in a microphotograph of FIG. 1, the individual particles assuming nearly a spherical shape.

<After-Treatment>

The spherical aluminum nitride powder (specifically, the one that is decarbonized) is, as required, pulverized, classified, and is adjusted to possess a desired grain size.

To improve water-resisting property and compatibility to the resin, further, the aluminum nitride particles may be treated for their surfaces by a known method. Concretely, there may be conducted a treatment with an organosilicon compound such as silicone oil, silylation agent or silane coupling agent, or with phosphoric acid or phosphate, or fatty acid, a treatment for forming a high-molecular film by using a polyamide resin, or a treatment for forming an inorganic film such as of alumina or silica.

<Use>

By utilizing the properties of the aluminum nitride, the spherical aluminum nitride powder obtained by the method of the present invention can be put to a wide and variety of applications and, specifically, can be used as a filler to be added to the heat radiating materials such as heat radiating sheet, heat radiating grease, heat radiating adhesive, coating material and heat conducting resin.

Here, as the resin or grease that serves as the matrix of the heat radiating, material, there can be used thermosetting resins such as epoxy resin and phenol resin; thermoplastic resins such as polyethylene, polypropylene, polyamide, polycarbonate, polyimide and polyphenylene sulfide; rubbers such as silicone rubber, EPR and SBR; and silicone oils.

Among them, a preferred matrix of the heat radiating material is, for example, an epoxy resin or a silicone resin. To obtain a highly flexible heat radiating material, it is desired to use a liquid silicone rubber of the addition reaction type.

To improve the thermal conductivity of the heat radiating material, it is desired to add the filler in an amount of 150 to 1000 parts by mass per 100 parts by mass of the resin, rubber or oil. In addition to the spherical aluminum nitride powder of the invention, the heat radiating material may be, further, filled with any one or a plurality of the fillers such as alumina, boron nitride, zinc oxide, silicon carbide and graphite. The shapes and particle diameters of the spherical aluminum nitride powder of the invention and other fillers may be selected depending on the properties and use of the heat radiating material. These fillers may have been treated for their surfaces with, for example, a silane coupling agent. Further, the ratio of mixing the spherical aluminum nitride powder and other fillers in the heat radiating material can be suitably adjusted over a range of from 1:99 to 99:1. The heat radiating material may be, further, blended with additives such as plasticizer, vulcanizing agent, cure promoter, parting agent and the like.

The above resin composition can be produced by being mixed using a blender or a mixer. The heat radiating material can be produced by forming the resin composition by the press-forming method, extrusion-forming method or doctor blade method followed by heat-curing.

EXAMPLES

The invention will now be described more concretely. It should, however, be noted that the invention is in no way limited to these Examples only. Properties in Examples and in Comparative Examples were measured by the methods described below.

(1) Average Particle Diameter.

The average particle diameter ($D_{50}$) was measured by dispersing the sample in an aqueous solution of sodium pyrophosphate by using a homogenizer and by using a laser diffraction grain size distribution meter (MICRO TRAC HRA manufactured by NIKKISO CO., LTD.).

(2) Shape of Particles.

The shape of the aluminum nitride powder was observed by using a scanning electron microscope (S-2600N manufactured by Hitachi, Ltd.).

(3) Sphericalness of Particles (Ratio of Long Diameter and Short Diameter).

A hundred particles were arbitrarily selected from the electron microphotograph, long diameters (DL) and short diameters (DS) of the particle images were measured by using a scale, and an average value of the ratios (DS/DL) was regarded as the sphericalness.

(4) Content of Cationic Impurities.

The content of cationic impurities (concentration of metal elements) was determined by dissolving the aluminum nitride powder with an alkali followed by neutralization with an acid, and by using an ICP emission spectroscope (ICPS-7510 manufactured by Shimadzu Corporation.).

(5) Lattice Constant of C-Axis of AlN Crystals.

The lattice constant of the C-axis of the aluminum nitride crystals was measured by using an X-ray diffraction apparatus (RINT-1400, manufactured by Rigaku Corporation.) and by using Si as an external standard material.

(6) Thermal Conductivity of the Silicone Rubber Sheet.

A thermal conductive silicone rubber composition was formed in a size of 10 cm×6 cm and in a thickness of 3 mm, and was heated and cured in a 150° C. hot air circulation-type oven for 1 hour, and was measured for its thermal conductivity by using a thermal conductivity meter (QTM-500 manufactured by KYOTO ELECTRONICS MANUFACTURING CO., LTD.). To prevent the leakage through the detector portion, measurement was taken via a 10 μm-thick polyvinylidene chloride film.

Example 1

There were used an α-alumina having an average particle diameter of 1.2 μm and a specific surface area of 10.7 m$^2$/g as the Al source, a carbon black having a specific surface area of 125 m$^2$/g as the carbon powder and an yttrium oxide having an average particle diameter of 1.0 μm and a specific surface area of 11.7 m$^2$/g as the rare earth metal compound.

100 Parts by mass of the α-alumina, 42 parts by mass of the carbon black and 3.0 parts by mass of the yttrium oxide were mixed, and the mixture thereof was filled in a graphite setter.

The mixture was reductively nitrided by firing under the conditions of a nitrogen atmosphere, a firing temperature of 1700° C. and a firing time of 15 hours, and was, thereafter, oxidized (decarbonization treatment) in the atmosphere of air at 700° C. for 12 hours to obtain an aluminum nitride powder.

The obtained aluminum nitride powder was measured for its average particle diameter, shape, ratio of long diameter and short diameter of the aluminum nitride particles, content of cationic impurities and lattice constant of the C-axis of the aluminum nitride crystals. The results were as shown in Table 1.

As the silicone resin, further, there was provided a mirable-type silicone (TSE201 manufacture by Momentive Performance Materials Inc.).

900 Parts by mass of the aluminum nitride power obtained above, 100 parts by mass of the above silicone resin and 0.5 parts by mass of a parting agent were kneaded together by using a pressurized kneader. Next, the kneaded product was cooled, mixed with 0.5 parts by mass of a crosslinking agent by using rolls, and was pressed at 180° C. for 15 minutes to obtain a sheet measuring 10 cm high, 6 cm wide and 3 mm thick.

The obtained sheet was measured for its thermal conductivity in accordance with the method described above. The result was as shown in Table 1.

Example 2

A spherical aluminum nitride powder was produced in the same method as in Example 1 but using the boehmite having an average particle diameter of 1.0 μm and a specific surface area of 12.7 m$^2$/g as the Al source instead of using the α-alumina.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 1. Further, by using the thus obtained aluminum nitride powder, a sheet was prepared in the same method as in Example 1 and was measured for its thermal conductivity. The result was as shown in Table 1.

Example 3

A spherical aluminum nitride powder was produced in the same method as in Example 1 but conducting the firing at a temperature of 1650° C.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 1. Further, by using the thus obtained aluminum nitride powder, a sheet was prepared in the same method as in Example 1 and was measured for its thermal conductivity. The result was as shown in Table 1.

Example 4

A spherical aluminum nitride powder was produced in the same method as in Example 1 but changing the amount of the yttrium oxide which was the rare earth metal compound into 1.0 part by mass.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 1. Further, by using the thus obtained aluminum nitride powder, a sheet was prepared in the same method as in Example 1 and was measured for its thermal conductivity. The result was as shown in Table 1.

Example 5

A spherical aluminum nitride powder was produced in the same method as in Example 1 but changing the amount of the yttrium oxide into 5.0 parts by mass.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 1. Further, by using the thus obtained aluminum nitride powder, a sheet was prepared in the same method as in Example 1 and was measured for its thermal conductivity. The result was as shown in Table 1.

Example 6

A spherical aluminum nitride powder was produced in the same method as in Example 1 but changing the amount of the carbon black into 39 parts by mass.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 1. Further, by using the thus obtained aluminum nitride powder, a sheet was prepared in the same method as in Example 1 and was measured for its thermal conductivity. The result was as shown in Table 1.

Example 7

An aluminum nitride powder was produced in the same method as in Example 1 but changing the amount of the yttrium oxide into 10 parts by mass.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 1. Further, by using the thus obtained aluminum nitride powder, a sheet was prepared in the same method as in Example 1 and was measured for its thermal conductivity. The result was as shown in Table

TABLE 1

|  | Ex. 1 | Ex. 2 | Ex. 3 | Ex. 4 | Ex. 5 | Ex. 6 | Ex. 7 |
|---|---|---|---|---|---|---|---|
| Starting material | *1 | *2 | *1 | *1 | *1 | *1 | *1 |
| Rare earth metal compound | Y2O3 | Y2O3 | Y2O3 | Y2O3 | Y2O3 | Y2O3 | Y2O3 |
| (mass pts.) | 3.0 | 3.0 | 3.0 | 1.0 | 5.0 | 3.0 | 10 |
| Carbon powder (mass pts.) | 42 | 42 | 42 | 42 | 42 | 39 | 42 |
| Firing temp. (° C.) | 1700 | 1700 | 1650 | 1700 | 1700 | 1700 | 1700 |
| Firing time (hrs) | 15 | 15 | 15 | 15 | 15 | 15 | 15 |
| Ave . ptcl. dia. (µm) | 4.2 | 3.9 | 3.4 | 3.5 | 4.8 | 5.3 | 5.4 |
| Shape | *3 | *3 | *3 | *3 | *3 | *3 | *3 |
| DS/DL (—) | 0.83 | 0.88 | 0.79 | 0.77 | 0.85 | 0.81 | 0.84 |
| Y content (ppm) | 28100 | 27900 | 29300 | 9900 | 45400 | 28000 | 96500 |
| Fe content (ppm) | 4 | 2 | 6 | 2 | 4 | 4 | 4 |
| S content (ppm) | 23 | 11 | 46 | 41 | 6 | 23 | 6 |
| Lattice const. of C-axis (Å) | 4.9806 | 4.9810 | 4.9801 | 4.9802 | 4.9810 | 4.9805 | 4.9811 |
| Thermal conductivity of sheet (W/mK) | 7.9 | 7.1 | 6.5 | 6.6 | 8.4 | 7.7 | 6.7 |

*1: α-alumina
*2: boehmite
*3: spherical

Comparative Example 1

An aluminum nitride powder was produced in the same method as in Example 1 but changing the amount of the carbon black into 36 parts by mass.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 2.

Further, by using the thus obtained aluminum nitride powder, it was attempted to prepare a sheet by kneading the powder together with a silicone resin and a parting agent in the same method as in Example 1. However, the viscosity of the kneaded product was so high that no sheet could be prepared.

Comparative Example 2

An aluminum nitride powder was produced in the same method as in Example 1 but changing the amount of the yttrium oxide into 0.3 parts by mass.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 2.

Further, by using the thus obtained aluminum nitride powder, it was attempted to prepare a sheet by kneading the powder together with a silicone resin and a parting agent in the same method as in Example 1. Like in Comparative Example 1, however, the viscosity of the kneaded product was so high that no sheet could be prepared.

Comparative Example 3

An aluminum nitride powder was produced in the same method as in Example 1 but conducting the firing at a temperature of 1920° C.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 2. Further, by using the thus obtained aluminum nitride powder, a sheet was prepared in the same method as in Example 1 and was measured for its thermal conductivity. The result was as shown in Table 2.

Comparative Example 4

An aluminum nitride powder was produced in the same method as in Example 1 but conducting the firing at a temperature of 1550° C.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 2.

Further, by using the thus obtained aluminum nitride powder, it was attempted to prepare a sheet by kneading the powder together with a silicone resin and a parting agent in the same method as in Example 1. However, the viscosity of the kneaded product was so high that no sheet could be prepared.

Comparative Example 5

An aluminum nitride powder was produced in the same method as in Example 1 but conducting the firing for one hour.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 2.

Further, by using the thus obtained aluminum nitride powder, it was attempted to prepare a sheet by kneading the powder together with a silicone resin and a parting agent in the same method as in Example 1. However, the viscosity of the kneaded product was so high that no sheet could be prepared.

Comparative Example 6

An aluminum nitride powder was produced in the same method as in Example 1 but changing the amount of the yttrium oxide into 35 parts by mass.

The average particle diameter, shape of the obtained spherical aluminum nitride powder, the ratio of long diameter and short diameter of the aluminum nitride particles, content of cationic impurities and lattice constant of the C-axis of the aluminum nitride crystals were as shown in Table 2.

Further, by using the thus obtained aluminum nitride powder, it was attempted to prepare a sheet by kneading the powder together with a silicone resin and a parting agent in the same method as in Example 1. However, the viscosity of the kneaded product was so high that no sheet could be prepared.

TABLE 2

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Starting material | *1 | *1 | *1 | *1 | *1 | *1 |
| Rare earth metal compound | Y2O3 | Y2O3 | Y2O3 | Y2O3 | Y2O3 | Y2O3 |
| (mass pts.) | 3.0 | 0.3 | 3.0 | 3.0 | 3.0 | 35 |
| Carbon powder (mass pts.) | 36 | 42 | 42 | 42 | 42 | 42 |
| Firing temp. (° C.) | 1700 | 1700 | 1920 | 1550 | 1700 | 1700 |
| Firing time (hrs) | 15 | 15 | 15 | 15 | 1 | 15 |
| Ave . ptcl. dia. (μm) | *2 | 1.4 | 5.5 | 1.3 | 1.5 | *2 |
| Shape | — | *3 | *3 | *3 | *3 | — |
| DS/DL (—) | *2 | 0.69 | 0.85 | 0.74 | 0.78 | *2 |
| Y content (ppm) | 29000 | 2860 | 19300 | 29600 | 29100 | — |
| Fe content (ppm) | 2 | 3 | 1 | 4 | 6 | 3 |
| S content (ppm) | 19 | 56 | 14 | 42 | 54 | 19 |
| Lattice const. of C-axis (Å) | 4.9804 | 4.9789 | 4.9793 | 4.9792 | 4.9791 | 4.9809 |
| Thermal conductivity of sheet (W/mK) | — | — | 3.9 | — | — | — |

*1: α-alumina
*2: could not be measured*
*3: spherical

INDUSTRIAL APPLICABILITY

The spherical aluminum nitride powder obtained by the present invention has a shape and a particle diameter suited for use as a filler and can be highly densely filled in a matrix such as resin or grease making it possible to obtain a heat radiating sheet, heat radiating grease, heat radiating adhesive and the like that feature high thermal conductivity.

The invention claimed is:

1. A method of producing a spherical aluminum nitride powder, comprising:
   (A) mixing 100 parts by mass of an alumina or an alumina hydrate having an average particle diameter of not more than 2 μm, 2 to 10 parts by mass of a compound containing a rare earth metal per 100 parts by mass of said alumina or said alumina hydrate, and 38 to 46 parts by mass of a carbon powder per 100 parts by mass of said alumina or said alumina hydrate to obtain a mixture thereof; and
   (B) reductively nitriding the alumina or the alumina hydrate in a state where said alumina or said alumina hydrate is dissolved in a liquid phase by holding said mixture in a nitrogen-containing atmosphere at a temperature of 1680 to 1750° C. for 8 to 17 hours.

2. A spherical aluminum nitride powder comprising aluminum nitride particles which have an average particle diameter of 3 to 30 μm, a content of a rare earth metal in a range of 1.8% by weight to 9.0% by weight calculated as an oxide thereof, and a lattice constant of the C-axis of the aluminum nitride crystals of not less than 4.9804 Å.

* * * * *